Feb. 23, 1971     R. FENELON ET AL     3,566,261
KELVIN-TYPE BRIDGE INCLUDING MULTISTAGE VOLTAGE DIVIDERS
Filed Oct. 28, 1968     2 Sheets-Sheet 1
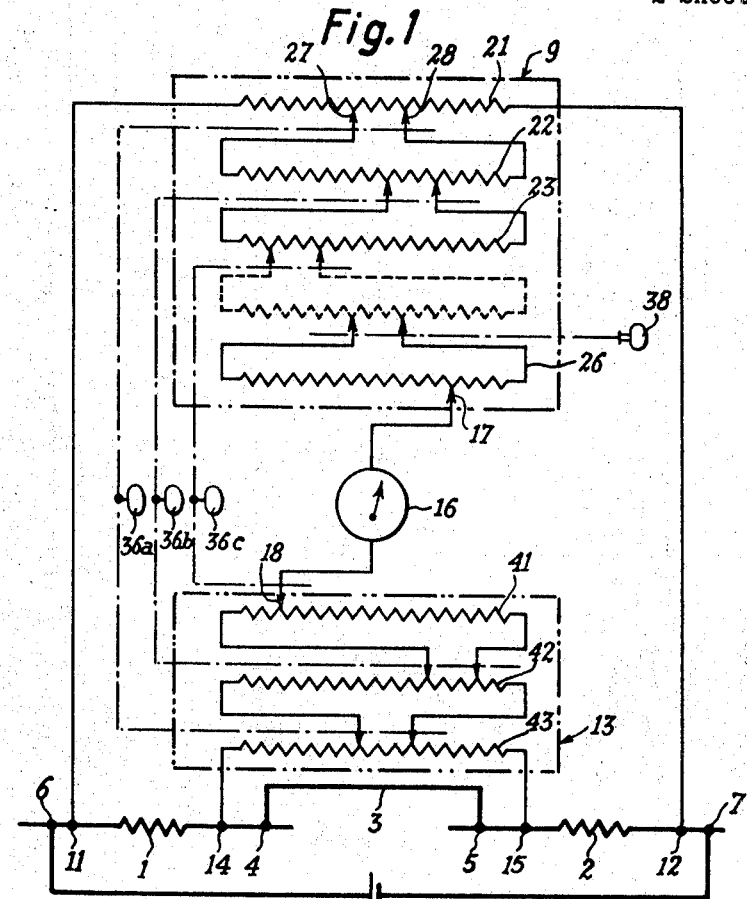
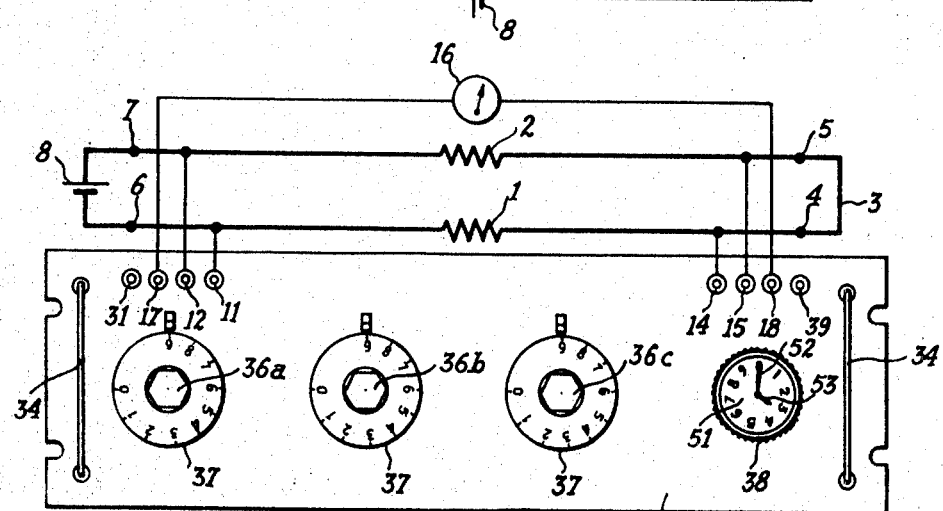
INVENTORS
ROBERT FENELON
ROGER SCURSOGLIO
By Young & Thompson
ATTYS.

United States Patent Office 3,566,261
Patented Feb. 23, 1971

3,566,261
KELVIN-TYPE BRIDGE INCLUDING MULTISTAGE VOLTAGE DIVIDERS
Robert Fenelon and Roger Scursoglio, Nice, Alpes-Maritimes, France, assignors to Societe Francaise de l'Electro-Resistance, Nice, Alpes-Maritimes, France, a French company
Filed Oct. 28, 1968, Ser. No. 771,088
Claims priority, application France, Nov. 3, 1967, 126,853
Int. Cl. G01r 27/02
U.S. Cl. 324—62        2 Claims

ABSTRACT OF THE DISCLOSURE

A Kelvin-type bridge for measuring the ratio between the resistance values of two resistors which comprises a main and an auxiliary three-terminal multistage voltage divider, the output sliders of which are connected through a null indicator. The sliders of the corresponding stages of the dividers are controlled by means of a single knob. The dividers are preferably made up of resistors of identical ohmic value in all stages. The value of the ratio is read directly from the knob dials when the double bridge is balanced as shown by the null indicator.

---

The present invention is concerned with an improved device which makes it possible to measure with a high degree of accuracy the ratio between the ohmic values of two resistors, especially in the case of resistors having low or intermediate ohmic values.

There is a frequent need for resistors in which high precision in absolute ohmic values is not required but in which, on the other hand, the ratios must be determined with very great accuracy. The ratio between the ohmic values of two resistors can be measured by means of a Wheatstone bridge but the precision of measurement is limited by that of the decade resistance boxes employed in this bridge by reason of the fact that said boxes comprise switches in which contact resistances of unstable and undetermined value are put in series with the calibrated resistors of the box. Furthermore, in the case in which the resistors to be compared are of low ohmic value, the parasitic contact resistances of said resistors and of the other elements of the bridge have an influence on the balance of this latter. The error thus caused can attain or even exceed 100 parts per million under the most favorable conditions.

The circuit which is known as a double bridge or Kelvin bridge has the effect of considerably reducing the influence of the parasitic contact resistances of resistors which are to be compared. However, it is necessary to take a separate measurement of resistance of each of the resistors to be compared and use is accordingly made of at least one decade resistance box having a precision which does not exceed 30 p.p.m. for the reasons mentioned above.

Another version of the Kelvin bridge is also known and this is the so-called slide-wire bridge which employs calibrated wires as standards. By means of the slide-wire bridge, a ratio between two resistances can be measured directly but the calibration of slide-wires cannot be effected with a very high degree of accuracy.

The object of the present invention is to overcome the disadvantages of these different methods by making it possible to measure the ratio between the ohmic values of two resistors both directly and with a high degree of accuracy even if said values are low and widely different from each other.

In accordance with the invention, the device for measuring the ratio between the ohmic values of two resistors which comprises between said resistors a main bridge and an auxiliary bridge mounted in a Kelvin double-bridge configuration is characterized in that each of the two bridges is constituted by a multi-stage voltage divider, each stage being connected by means of sliders to two variable points of the preceding stage and comprising divisional resistors having the same ohmic value and permanently connected in series and means for ensuring between the sliders an impedance which is constant irrespective of the position of said sliders, said impedance being also equal to the ohmic value of each of the divisional resistors of the preceding stage.

The voltage dividers thus constituted considerably reduce the effect of the parasitic resistances of the sliders, with the result that the advantages of the double-bridge configuration are combined with the high precision which is provided by the voltage dividers.

In a preferred embodiment of the invention, the divisional resistors have the same ohmic value in all stages of a divider, a fixed balancing resistor being connected between the two sliders of each stage in order that the impedance between said sliders should be equal to the ohmic value of the divisional resistors. Said value is preferably of the order of 10 kilohms.

It is in fact already known to produce resistors of this value which are endowed with both high precision and high stability.

Further properties and advantages of the invention will become apparent from the description which is given hereinafter.

A preferred embodiment of the invention is illustrated in the accompanying drawings which are given solely by way of example and not in any limiting sense, and in which:

FIG. 1 is a diagram of a double bridge comprising two voltage dividers in accordance with the invention;

FIG. 3 is a front view in elevation showing a device for the measurement of ratio in accordance with the invention.

Figure 2:
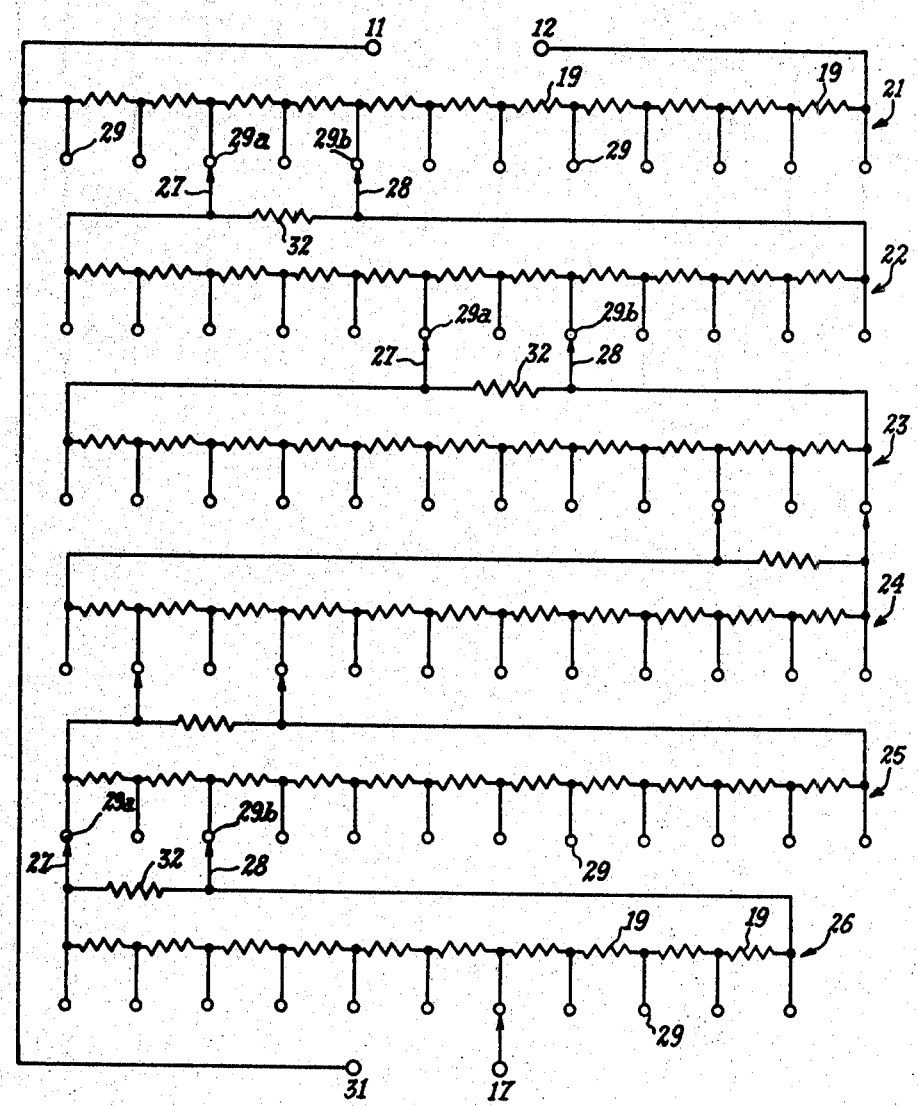
FIG. 2 is a diagram showing a particular construction of a voltage divider.

The device for measurement of the ratio between the ohmic values of two resistors is particularly well suited to the case in which the resistors 1, 2 to be compared (as shown in FIG. 1) have a low or intermediate ohmic value. It is known that, in this case, in order to reduce the influence of parasitic contact resistances, each resistor to be compared is provided with four connection points which will be designated hereinafter as terminals for the sake of simplicity. Accordingly, the resistor 1 is provided with two outer terminals 4 and 6 and two inner terminals 11 and 14. Similarly, the resistor 2 is provided with two outer terminals 5 and 7 and two inner terminals 12 and 15.

The two resistors 1 and 2 to be compared are put in series by means of the connection 3, the ohmic value of which is as low as possible and which connects the outer terminals 4 and 5. The circuit which is thus constituted is coupled with a high-stability current source 8 which is connected between the outer terminals 6 and 7. A main three-terminal multistage voltage divider 9 has two terminals connected respectively to the inner terminals 11 and 12 of resistors 1 and 2 which are adjacent to terminals 6 and 7 connected to the current source 8. An auxiliary three-terminal multistage voltage divider 13 has two terminals connected respectively to the inner terminals 14 and 15 of resistors 1 and 2 which are adjacent to terminals 4 and 5 connected together by connection 3. The third terminals, 17 and 18 respectively, of each of the multistage dividers 9 and 13 are connected to a high sensitivity zero detecting device 16.

The voltage dividers 9 and 13 are of the multistage type. Inasmuch as the precision of the main divider 9 is more critical than that of the auxiliary divider 13, this latter can comprise a lesser number of stages than the main divider 9. For example, the main divider 9 comprises five or six stages 21 to 26 whilst the auxiliary divider 13 only comprises three stages 41 to 43. Each stage such as 23 with the exception of the first stage 21 is connected by means of two sliders 27, 28 to two variable points of the preceding stage 22. The sliders of corresponding stages such as the stages 22 and 42 or the stages 23 and 41 are coupled mechanically and controlled by means of a same knob 36a or 36b or 36c. The sliders of the stages such as 26 of the main divider 9 which have no corresponding stage in the auxiliary divider 13 are controlled by means of separate knobs such as 38.

There is shown in FIG. 2 a detail diagram of a preferred construction of a voltage divider. Each stage such as 21 with the exception of the last stage 26 comprises eleven divisional resistors 19 which are permanently connected in series. The ohmic value of all the resistors 19 is the same in all stages and is selected from a range in which it is known to construct resistors having both high precision and high stability. This value can be 10 kilohms, for example. The final stage 26 only comprises ten resistors 19. The points of junction between two consecutive resistors 19 are connected to contact-studs 29 over which are displaced the sliders 27, 28 which are connected to the ends of the following stage 22. Said sliders are so arranged that they are simultaneously in contact with two studs 29a and 29b which are separated by two resistors 19. A balancing resistor 32 is mounted between the sliders 27 and 28 of each stage, the ohmic value of said resistor being so determined that the impedance presented between said two sliders is equal to the common ohmic value of the divisional resistors 19. In the case which is illustrated, the ohmic value of the balancing resistor 32 is equal to 2.5 times the ohmic value of the resistors 19. The ends of the first stage 21 are connected to the input terminals 11, 12 of the divider. An output slider 17 moves over the contact-studs 29 of the last stage 26.

If a fixed voltage U is applied to the input terminals 11, 12, the voltage developed across the terminals of each resistor 19 of the first stage 21 is equal to one-tenth of U. The voltage developed between the ends of the second stage 22 is also equal to one-tenth of U, with the result that the terminal voltage of each resistor 19 of this stage is equal to one-hundredth of U and so forth in sequence. The voltage measured between the output slider 17 and the input terminal 11 will therefore be equal to the input voltage U multiplied by a decimal number, the successive digits of which are represented by the number of divisional resistors 19 which are located in each stage between the contact-stud 29a and the end of the stage. In order to enhance flexibility of use, there has been added a second output terminal 31 which is connected directly to the input terminal 11. Said terminal 31, which is not employed in the device for measuring the ratio between two resistors, serves to collect the divided voltage when the voltage divider is employed separately.

Inasmuch as the precision of a divider stage is correspondingly less critical as said stage is of a higher order, the last stages of the main divider 9 are preferably replaced by a precision potentiometer, for example of the helical wire-wound type in which the slider is capable of performing a number of revolutions.

There is shown in FIG. 3 a particular embodiment of the invention in which the main divider 9 comprises six stages and the auxiliary divider 13 comprises three stages. The elements of the two dividers are mounted on a panel 35 which is adaptable to a standardized measuring frame and provided with operating handles 34. The resistors 19 of the corresponding stages of two voltage dividers 9 and 13 are disposed on a same selector switch, with the result that the value of the ratio provided by the two dividers is automatically the same in all positions of the selector switches. Said switches are operated by means of knobs 36a, 36b, 36c, provided with dials 37 which are graduated directly in ratio values. The three last stages of the main divider 9 are formed by means of a precision potentiometer with a helical coil, the slider of which is capable of carrying out ten revolutions. Said slider is operated by means of a knob 38, two pointers 52 and 53 being displaced at the same time by said knob and adapted to move in front of a fixed dial 51 which is graduated from one to ten. When the slider of the potentiometer completes one turn, the pointer 52 carries out one revolution about the dial 51 whereas the pointer 53 moves by one graduation. By interpolating between two graduations, it is therefore possible to estimate three significant digits of the ratio established by the potentiometer. The four terminals of the dividers 9 and 13 which bear the same reference numerals as in FIG. 1 are all accessible.

In order to measure the ratio between the ohmic values of two resistors 1 and 2, it is only necessary to construct the circuit shown in FIG. 1 and reproduced in FIG. 3 and to operate the control knobs 36 and 38 until the null detector 16 has returned to zero. The ratio between the values of the resistors 1 and 2 is then related by means of a simple formula to the ratio of the two dividers which is read directly from the dials 37 and 51.

The device can also be employed for the purpose of regulating one of the two resistors, for example the resistor 2, in order that the ohmic value thereof should be in a predetermined ratio to the ohmic value of the resistor 1. In this case, the value of the desired ratio is indicated in advance on the dials 37, 51 and the resistor 2 is adjusted until the null detector 16 indicates 0.

The measuring device in accordance with the invention provides the following important advantages:

In the first place, in the case of a direct measurement of ratio, the device makes profitable use of the advantages provided by the Kelvin bridge for the measurement of the ohmic value of a resistor. The parasitic contact resistances at the terminals 6 and 7 (FIG. 1) through which a relatively high current passes are eliminated inasmuch as they are located in series in the circuit of the current source and the contact resistances at the terminals 4 and 5 through which a high current also passes have only very little influence on the measurement by virtue of the action of the auxiliary divider 13.

Moreover, the parasitic contact resistances between the sliders 27, 28 and the contact-studs 29 (FIG. 2) of the voltage dividers 9 and 13 are in series with resistors having a high ohmic value and their effect is consequently negligible.

In addition, inasmuch as the voltage dividers 9 and 13 are made up of resistors 19 which have the same ohmic value, these resistors can be matched with very high precision, with the result that a very accurate ratio of the dividers can be obtained.

Mechanical coupling between the sliders of the two dividers 9 and 13 is conducive to easy manipulation and increases the rapidity of measurement, this consideration being of major importance in industrial testing applications.

The construction of the last stages of the main divider 9 in the form of a potentiometer reduces the cost price without any detriment to accuracy.

As will be readily understood, the invention is not limited to the construction which has just been described and for which alternative forms may be devised without thereby departing from the scope of this invention. Accordingly, it would be feasible to vary the number of stages of either of the voltage dividers and to change the ohmic values of the resistors which make up said dividers.

What is claimed is:

1. A Kelvin-type bridge for measuring the ratio between the values of two resistors comprising a pair of resistors to be compared, means connecting one end of each of said resistors, a main three-terminal multistage voltage divider and an auxiliary three-terminal multistage voltage divider, the other ends of each of said resistors connected to two terminals, respectively, of said main divider and also adapted to be connected to a source of voltage, said one end of each of said resistors also connected to two terminals, respectively, of said auxiliary divider, the remaining terminals of the dividers adapted to be connected to an indicating means, each of said multistage dividers including:

- a plurality of stages comprising series-connected divisional resistors, all said resistors in one of said stages having the same ohmic value,
- a plurality of sets of two wipers, each of said sets connecting the extremities of one of said stages to two variable points of the preceding stage,
- and means for ensuring between each set of two wipers an impedance which is constant irrespective of the position of said wipers and which is equal to the ohmic value of one divisional resistor of the preceding stage.

2. A Kelvin-type bridge for measuring the ratio between the values of two resistors comprising a pair of resistors to be compared, means connecting one end of each of said resistors, a main three-terminal multistage voltage divider and an auxiliary three-terminal multistage voltage divider, the other ends of each of said resistors connected to two terminals, respectively, of said main divider and also adapted to be connected to a source of voltage, said one end of each of said resistors also connected to two terminals, respectively, of said auxiliary divider, the remaining terminals of the dividers adapted to be connected to an indicating means, each of said multistage dividers including:

- a plurality of stages comprising series-connected divisional resistors, all said resistors in every said stage having the same ohmic value,
- a plurality of sets of two wipers, each of said sets connecting the extremities of one of said stages to two variable points of the preceding stage, said two variable points being separated by two divisional resistors,
- and a plurality of equal-valued fixed balancing resistors, each of which is connected between the two wipers of each set of wipers and the common value of said balancing resistors being such that the impedance beween each set of two wipers is equal to the common value of the divisional resistors.

References Cited
UNITED STATES PATENTS 3,307,104    2/1967    Shirk      324—62
3,403,336    9/1968    Coor et al.      324—63

OTHER REFERENCES

Clothier, W. K., A Switch-Dial Potential Divider, in Journal of Scientific Instruments, vol. 33, pp. 196–198, May 1956.

EDWARD E. KUBASIEWICZ, Primary Examiner